United States Patent [19]
Rahman et al.

[11] Patent Number: 5,802,602
[45] Date of Patent: Sep. 1, 1998

[54] METHOD AND APPARATUS FOR PERFORMING READS OF RELATED DATA FROM A SET-ASSOCIATIVE CACHE MEMORY

[75] Inventors: Monis Rahman, San Jose; Mircea Poplingher, Campbell; Tse-Yu Yeh, Milpitas; Wenliang Chen, Sunnyvale, all of Calif.

[73] Assignee: Intel Corporation, Santa Clara, Calif.

[21] Appl. No.: 785,199

[22] Filed: Jan. 17, 1997

[51] Int. Cl.$^6$ ............................................. G06F 1/00
[52] U.S. Cl. .................... 711/204; 711/100; 711/117; 711/118; 711/128; 711/1; 711/3; 711/204; 711/205; 711/137; 365/49
[58] Field of Search .................... 711/100, 117, 711/118, 128, 1, 3, 204, 205, 137; 365/49

[56] References Cited

U.S. PATENT DOCUMENTS

| | | | |
|---|---|---|---|
| 4,464,713 | 8/1984 | Benhase et al. | 711/205 |
| 5,361,391 | 11/1994 | Westberg | 711/137 |
| 5,522,057 | 5/1996 | Lichy | 711/144 |
| 5,581,719 | 12/1996 | Steely, Jr. et al. | 395/383 |
| 5,586,294 | 12/1996 | Goodwin et al. | 711/137 |
| 5,651,135 | 7/1997 | Hatakeyama | 711/128 |
| 5,652,858 | 7/1997 | Okada et al. | 711/137 |

*Primary Examiner*—Tod R. Swann
*Assistant Examiner*—Mehdi Namazi
*Attorney, Agent, or Firm*—Blakely, Sokoloff, Taylor & Zafman

[57] ABSTRACT

Allocation circuitry for allocating entries within a set-associative cache memory is disclosed. The set-associative cache memory comprises N ways, each way having M entries and corresponding entries in each of the N ways constituting a set of entries. The allocation circuitry has a first circuit which identifies related data units by identifying a probability that the related data units may be successively read from the cache memory. A second circuit within the allocation circuitry allocates the corresponding entries in each of the ways to the related data units, so that related data units are stored in a common set of entries. Accordingly, the related data units will be simultaneously outputted from the set-associative cache memory, and are thus concurrently available for processing. The invention may find application in allocating entries of a common set in a branch prediction table (BPT) to branch prediction information for related branch instructions.

22 Claims, 12 Drawing Sheets

METHOD AND APPARATUS FOR PERFORMING READS OF RELATED DATA FROM A SET-ASSOCIATIVE CACHE MEMORY

FIELD OF THE INVENTION

The present invention pertains to a method and apparatus for performing a cache memory access. More particularly, the present invention relates to a method and apparatus for performing simultaneous reads of related data from a N-way set-associative cache memory, such as a branch prediction table.

BACKGROUND OF THE INVENTION

A cache memory is a buffer memory located between a data source, such as the main memory of a computer system, and a data destination, such as a central processing unit (CPU) of the computer system. A cache memory provides a small, fast access "mirror" (or duplicate) of portions of the data source to the data destination. In view of the fast access time of a cache memory, it is desirable to maximize the number of accesses to the cache memory, so as to provide an overall performance advantage. This is achieved by storing data in the cache memory which has the highest probability of being required by the data destination. Data having either a temporal or spatial locality to data most recently retrieved, by the data destination from the data source, is an ideal candidate for storage in the cache memory as instruction streams often have a highly sequential and loop-oriented nature. For example, when data is retrieved from a data source, there is a fair probability that data stored at sequential locations, following the location from which that data was retrieved, will also be required at the data destination in the near future. Accordingly, data stored in the sequential locations may be propagated to a cache memory in anticipation of being required in the near future. Similarly, there is also a high probability that data recently retrieved from the data source will itself again be required at the data destination in the near future.

For this reason, data recently retrieved from the data source is commonly also stored in a cache memory.

There are numerous considerations which affect the efficiency of a cache memory, such as line size, placement and mapping method. A number of widely used mapping methods are founded in the principles of associativity. Three basic mapping methods that are commonly employed include the direct, fully associative and set-associative mapping methods. In a direct-mapped cache memory, each location at a data source can be mapped to a single, unique location in the cache memory. In a fully associative cache memory, each location at a data source may be mapped to any location in the cache memory.

In a set-associative mapping, the cache memory is divided into a number of "ways", each way having a predetermined number of entries. A location at a data source may be mapped to any one entry of a "set" of entries, each entry of the set being located in a different way. For example, in a 4-way, set-associative cache memory, a location X at the data source may be mapped to the Mth entry of any one of ways 0 to 3, depending on availability.

In state of the art microprocessors, cache memories are being used on an increasing scale, and in increasingly diverse applications, to optimize performance. To attempt a cache read from any one of these cache memories, it is currently necessary to generate a pointer, which indexes a location at the data source, and to detect a "hit" in the cache memory by comparing at least a portion of the pointer to a series of tags associated with entries in the cache memory. On the occurrence of a "hit" (i.e. when the relevant portion of the pointer corresponds to a tag), the cache memory is accessed, and the information located at the "hit" location in the cache memory is propagated to the data destination. To perform a read from a further location at the data source, the pointer is regenerated to point to the further location, which may be a sequential location or branch target location to which the instruction stream has been resteered.

Referring to FIG. 1, there is shown a generic cache memory arrangement 10. The cache memory arrangement 10 is a 2-way, set-associative cache memory, and comprises ways 12 and 14, directories 16 and 18 (also known as a tag random access memories (RAMs)), a comparator 20, a multiplexer (MUX) 22, and a pointer latch 24. The ways 12 and 14 each have N entries for storing data and/or instruction information. For the purposes of this specification the term "data unit" shall be taken to refer to both data and instruction information. The directories 16 and 18 are associated with the ways 12 and 14 respectively, and each contains N entries. Each entry in a directory 16 or 18 corresponds to an entry in a way 12 or 14, and stores a tag value (for example, an address at a data source being mirrored by the cache memory 10) by which the contents of the corresponding entry in a way can be identified.

The pointer latch 24 is coupled to receive a pointer value 25 from a pointer generator 26. At least a portion of the pointer value 25 stored in the latch 24 is used to index and retrieve the contents of an entry in either way 12 or 14. For example, FIG. 1 shows the pointer value 25 including a tag portion 25.1 and a set index portion 25.2. The width and relative positions of portions 25.1 and 25.2 may vary, depending on the size and arrangement of the cache memory 10, and also the indexing circuitry associated therewith. In the illustrated example, the set index portion 25.2 is used to index ENTRY 1 (i.e. the second line) of each of the ways 12 and 14 and the directories 16 and 18. The information stored in ENTRY 1 of both ways 12 and 14 is then propagated to the MUX 22, which is operable, by a signal received from the comparator 20, to output information received from either of the ways 12 or 14, or to produce no output. The tag values stored in ENTRY 1 of directories 16 and 18 are similarly propagated to the comparator 20, where they are compared to the tag portion 25.1. If either of the tag values correspond to the tag portion 25.1 (i.e. there is a "hit"), then a signal is propagated to the MUX 22, causing the MUX 22 to output the information received from the way entry corresponding to the directory entry on which the hit occurred. On the other hand, if the tag portion 25.1 does not correspond to either of the tag values stored in ENTRY 1 of the directories 16 and 18, then no hit has occurred, and the MUX 22 is signaled not to produce an output. With respect to the cache memory 10, it will be appreciated that to retrieve the contents of a further entry in either of the ways 12 or 14, it is necessary to regenerate the pointer value 25 at the pointer generator 26, propagate this pointer value 25 to the pointer latch 24, and again perform the series of operations described above.

The regeneration of the pointer is undesirable for a number of reasons. Firstly, the regeneration of the pointer is time consuming. Secondly, the access of the cache memory in response to the regeneration of the pointer is also time consuming. Accordingly, in a pipelined microprocessor, "bubbles" may be introduced into the pipeline, as the microprocessor stalls while waiting for the regeneration of the pointer, and for the data to be retrieved from the cache memory. Thirdly, the regeneration of the pointer, and the subsequent cache memory access, consume power. This power consumption is undesirable for heat generation reasons and, particularly in portable computers, for power consumption reasons.

SUMMARY OF THE INVENTION

According to a first aspect of the invention there is provided a computer-implemented method of allocating entries within a set-associative cache memory having first and second ways. Each way has a plurality of entries, wherein corresponding entries of each of the first and second ways constitute respective sets of entries. The method requires identifying first and second data units as being related by a probability of being successively read from the cache memory. Thereafter the first and second data units are stored in the corresponding entries in the respective first and second ways, so that the first and second data units are stored in a common set.

The step of identifying the first and second data units as being related may require identifying the first data unit as being associated with a main memory address X, and identifying the second data unit as being associated with a main memory address X+1. Alternatively, the step of identifying the first and second data units as being related may require identifying the first data unit as being prediction data for a branch instruction located at main memory address X, and identifying the second data unit as being prediction data for a branch instruction located at main memory address X+1.

In a further embodiment, the step of identifying the first and second data units as being related requires identifying the first data unit as being associated with a main memory address at which is stored a branch instruction, and identifying the second data unit as being associated with a main memory address at which is a target address of the branch instruction.

In yet a further embodiment, the set-associative cache memory maintains a branch prediction table, and the step of identifying the first and second data units as being related requires identifying the first data unit as being a prediction for a first branch instruction, and identifying the second data unit as being a prediction for a second branch instruction which is located at a target address of the first branch instruction.

In even a further embodiment, the step of identifying the first and second data units as being related requires identifying the first data unit as being related to a first instruction and identifying the second data unit as being related to a second instruction, wherein the first and second instructions are stored within a common instruction cache line in an instruction cache.

To output the first and second data units, both the corresponding entries in each of the first and second ways is indexed with a pointer, and the first and second data units are simultaneously outputted from the corresponding entries of the first and second ways to output selection circuitry. In one embodiment, the set-associative cache memory maintains a branch prediction table, and the first data unit is prediction information relating to a first branch instruction and the second data unit is prediction information relating to a second branch instruction. In this embodiment, a determination is made as to whether the prediction information for the first branch instruction indicates the first branch instruction as being not taken. If the first branch instruction is predicted as being not taken, then the prediction information for the first and second branch instructions is outputted from the output selection circuitry. If the first branch instruction is predicted to be taken, then only the prediction information for the first branch instruction is outputted from the output selection circuitry.

According to a second aspect of the invention there is provided allocation circuitry for allocating entries within a set-associative cache memory. The set-associative cache memory comprises first and second ways, each way having first and second entries, the first entries of the respective first and second ways comprising a first set, and the second entries of the respective first and second ways comprising a second set. The allocation circuitry comprising includes a first circuit which identifies first and second data units as being related by a probability of being successively read from the cache memory. A second circuit within the allocation circuitry allocates the first entries of each of the first and second ways to the first and second data units respectively, so that the first and second data units are stored in a common set of entries.

In a first embodiment, the first circuit identifies the first and second data units as being related by identifying the first data unit as being associated with a main memory address X, and identifying the second data unit as being associated with a main memory address X+1.

In a second embodiment, the set-associative cache memory maintains a branch prediction table, and the first circuit identifies the first and second data units as being related by identifying the first data unit as being prediction data for a branch instruction located at main memory address X, and by identifying the second data unit as being prediction data for a branch instruction located at main memory address X+1.

In a third embodiment, the first circuit identifies the first and second data units as being related by identifying the first data unit as being associated with a main memory address at which is stored a branch instruction, and identifying the second data unit as being associated with a main memory address which is a target address of the branch instruction.

In a fourth embodiment, the first circuit identifies the first and second data units as being related by identifying the first data unit as being related to a first instruction and identifying the second data unit as being related to a second instruction, wherein the first and second instructions are stored within a common instruction cache line in an instruction cache.

According to a third aspect of the invention, there is provided a set-associative cache memory arrangement including a set-associative cache memory having first and second ways. The first and second ways each have first and second entries and the respective first entries together comprise a first set and the respective second entries together comprise a second set. The memory arrangement also includes allocation circuitry which identifies first and second data units, to be stored in the set-associative cache memory, as being related by a probability of being successively read from the cache memory. The allocation circuitry also allocates the first data unit to the first entry of the first way, and the second data unit to the first entry of the second way, so that the first and second data units are stored in the first set. The memory arrangement also includes retrieval circuitry which indexes the first entries in each of the first and second ways with a pointer, and simultaneously retrieves the first and second data units from the first entries of the first and second ways.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for performing reads of related data from a N-way, set-associative cache memory are described. In the following description, for purposes of explanation, numerous specific details are set forth in order to provide a thorough understanding of the present invention. It will be evident, however, to one skilled in the art that the present invention may be practiced without these specific details.

Computer System and Microprocessor Overview

Figure 2:
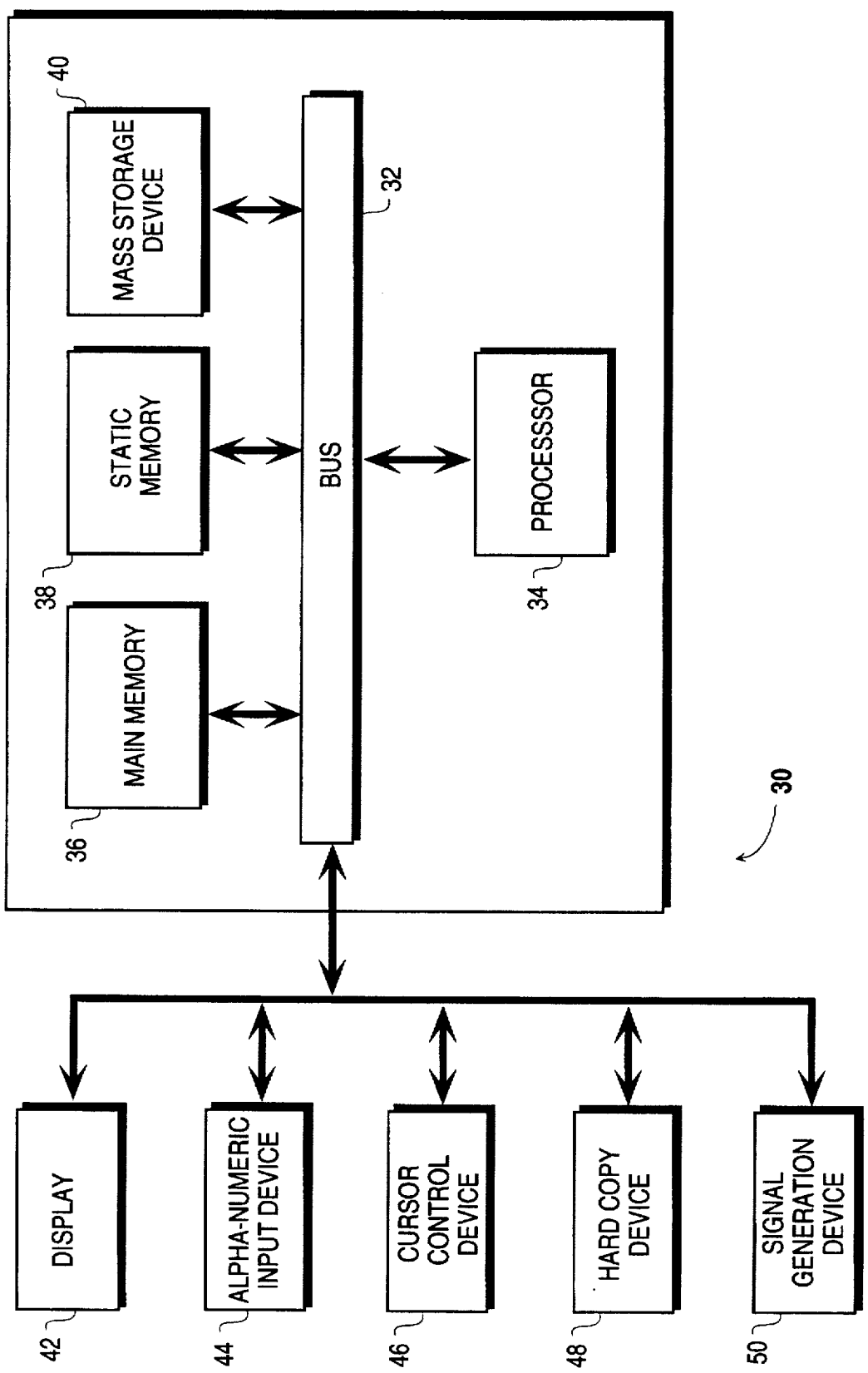
FIG. 2 is a diagrammatic representation of a computer system in which the present invention may be implemented.

Referring to FIG. 2, an overview of a computer system 30, which may be utilized in conjunction with any one of the described embodiments of the present invention, is shown in block diagram form. It will be understood that, while FIG. 2 is useful for providing an overall description of a computer system, a number of details of the system are not shown. As necessary for disclosure of the present invention, further detail is set forth with reference to other figures provided with the specification. Further, the present invention is described with reference to exemplary embodiments. Alternative embodiments which may be conceived by one of ordinary skill in the art are considered within the scope of the invention. As illustrated in FIG. 2, the computer system 30 comprises a bus 32 for communicating information, a microprocessor 34, coupled to the bus 32, for processing information, and a main memory 36, which is typically a random access memory (RAM), for storing data and instructions for the microprocessor 34. For the purposes of this specification the term "data unit" shall be taken to refer to both data, instruction and control information. The main memory 36 is also coupled to the bus 32. A static memory 38, in the form of a read only memory (ROM) or other non-volatile storage device, is coupled to bus 32, and stores non-volatile information and instructions for the microprocessor 34. A mass storage device 40, such as a magnetic disk and associated drive unit, is also coupled to the bus 32 and stores information and instructions for use within the computer system 30. A display unit 42 (such as a cathode ray tube (CRT) or liquid crystal display (LCD)), an alphanumeric input device 44 (such as a keyboard), a cursor control device 46 (such as a mouse or other pointing device), a hard copy device 48 (such as a printer or plotter for providing visual representations of computer images), and a signal generation device 50 (such as a microphone or loudspeaker) are all coupled to the bus 32, and are thereby coupled to each other and to the other components of the computer system 30.

Figure 1:
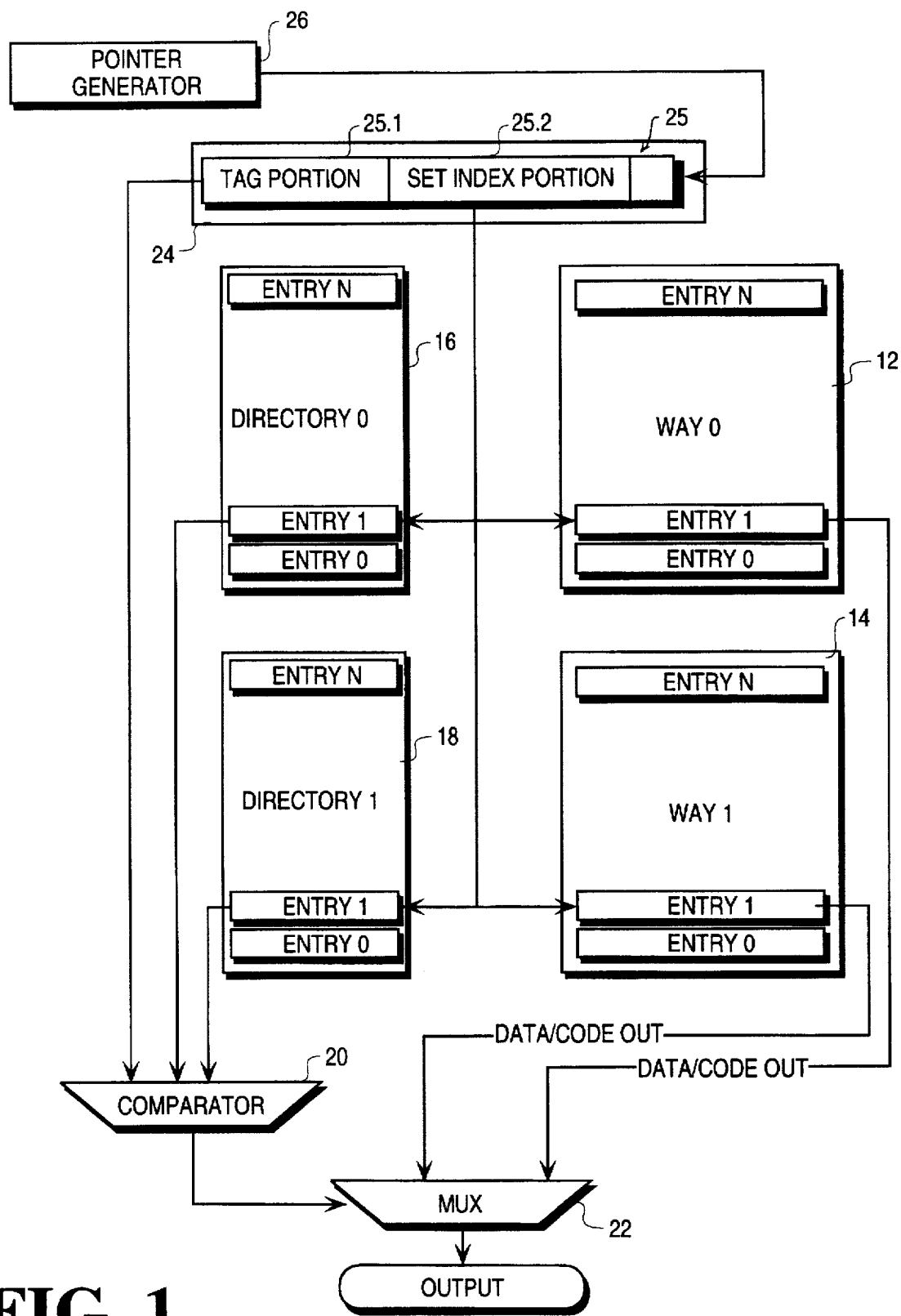
FIG. 1 is a diagrammatic representation of a cache memory arrangement.
Figure 3:
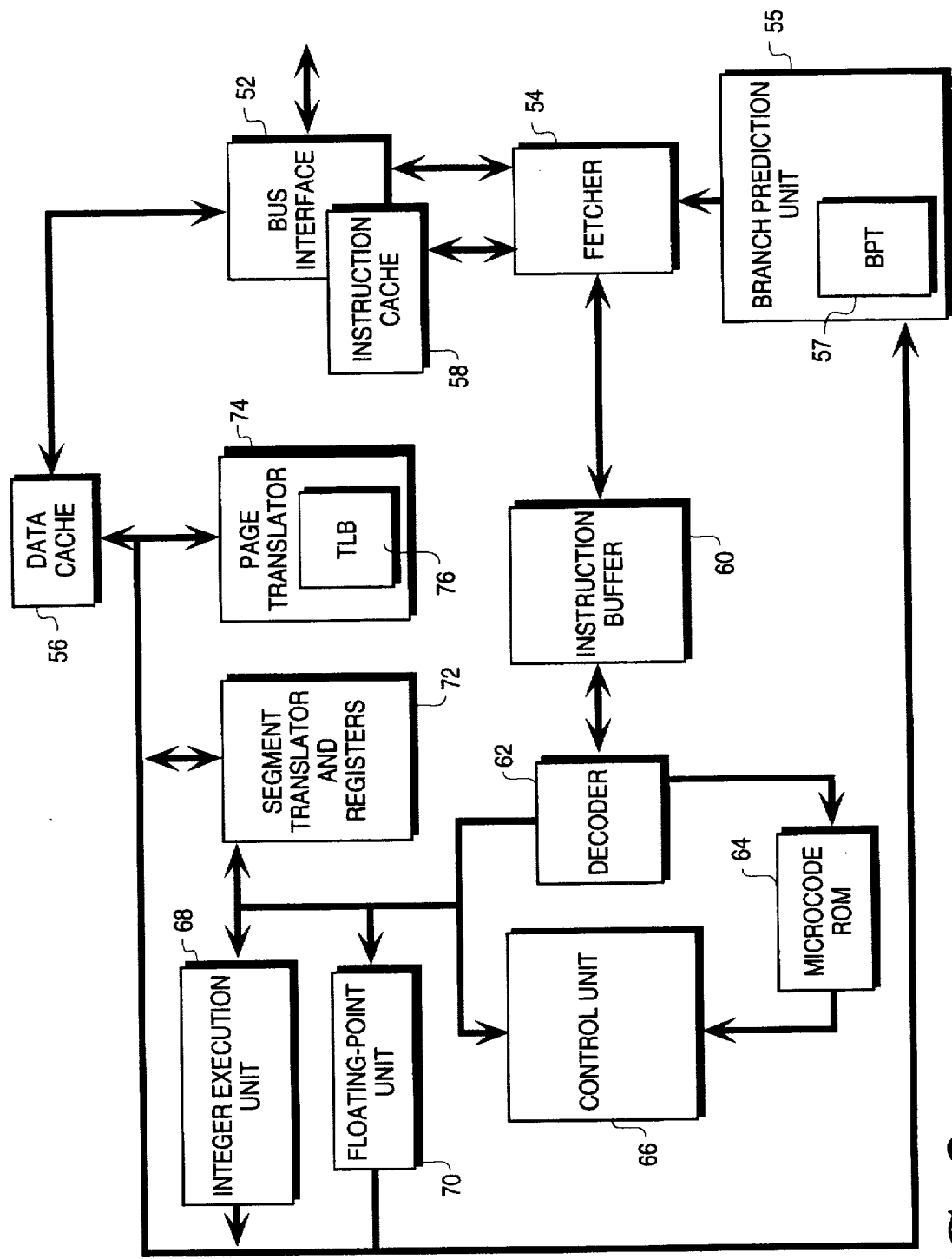
FIG. 3 is a diagrammatic representation of a microprocessor in which the present invention may be implemented.

Referring now to FIG. 3, a more detailed overview of the microprocessor 34 of FIG. 1 is shown in block diagram form. The microprocessor 34 comprises a bus interface unit 52, which provides the interface between the microprocessor 34 and the bus 32 of the computer system 30. The bus interface unit 52 is coupled to allow a fetcher 54 and a data cache 56 to access the main memory 36 of the computer system 30. Also coupled the fetcher 54 is an instruction cache 58, also referred to in the art as a code cache. The fetcher 54 retrieves instructions, indexed by an instruction pointer generated within a branch prediction unit 55, from the instruction cache 58 or from main memory 36 via the bus interface unit 52. The branch prediction unit 55 speculatively predicts target addresses for branch instructions retrieved by the fetcher 54, and outputs an instruction pointer dependent on the speculative branch prediction process. The branch prediction unit 55 includes a branch prediction table (BPT) 57, which is implemented in a cache memory, and provides a cache of branch prediction information for branch instructions recently encountered by the microprocessor 34.

The fetcher 54 propagates instructions retrieved from either the instruction cache 58, or the main memory 36, to an instruction buffer 60, from which a decoder 62 retrieves instructions, when required, for decoding. As the rate at which instructions are retrieved by the fetcher 65 is not necessarily equal to the rate at which instructions are consumed by the decoder 62, the instruction buffer 60 provides decoupling between the fetcher 54 and the decoder 62. To this end, it is convenient to regard the fetcher 54, the instruction cache 58 and the bus interface unit 52 as comprising a front end of the microprocessor 34, which is decoupled from the back end of the microprocessor 34, comprising the remaining circuitry described below, by the instruction buffer 60. A microcode read only memory (ROM) 64 is coupled to the decoder 62 and receives entry-points from the decoder 62. The decoder 62 and a microcode ROM 64 supply microcode instructions to a control unit 66. The control unit 66 supplies an integer pipeline execution unit 68, and a floating-point pipeline execution unit 70, with integer and floating-point instructions, respectively, for execution. The integer pipeline execution unit 68 and the floating-point pipeline execution unit 70 have access to the data cache 56 when executing the instructions. The integer pipeline execution unit 68 and the floating-point pipeline execution unit 70 are furthermore both coupled to memory management logic, which comprises a segment translator 72 and a page translator 74, the page translator 74 incorporating a translation lookaside buffer (TLB) 76, which is a cache memory storing address translation information for recently encountered instructions. To perform the requisite functions, the integer pipeline execution unit 68 and the floating-point pipeline execution unit 70 each contain sets of address generation logic, arithmetic logic and cache memory interfaces.

Apparatus for Performing Reads of Related Data Units from a Set-Associative Cache Memory As described above with reference to FIG. 1, in a N-way, set-associative cache memory, a first SET INDEX portion of a pointer is used in index corresponding entries in each of the N ways into which the cache memory is arranged. For example, bits X to X+6 of a pointer may be used to index the Mth entry of 128 entries of each of the N ways. The contents of the Mth entries of the N ways are then simultaneously outputted to output selection circuitry, where the contents of a specific Mth entry is outputted if a tag portion of the pointer corresponds to a tag associated with the specific Mth entry. To retrieve further data from the cache memory, the pointer must then be regenerated. The Mth entries of the N ways are collectively labeled a "set" of entries.

The present invention proposes using the fact that the Mth entries of the N ways (or a Mth "set" of entries) are simultaneously outputted to output control circuitry to provide a performance advantage in certain circumstances. It often occurs that when data is retrieved from a location indicated by a pointer, such as a location in main memory indexed by an instruction pointer, that an immediately subsequent retrieval will be from a related location. For example, when an instruction is retrieved from address X in main memory, it is probable that the next instruction to be retrieved from the main memory is located at address X+1. Further, if the instruction at address X is a branch instruction, there is also a probability that the next required instruction, as identified by an instruction pointer, will be located at a branch target address.

Accordingly, the present invention proposes a cache memory arrangement in which related data units, for example instructions located at sequential or otherwise related main memory address (or other information pertaining to such instructions) are stored in a common set of entries within a N-way, set-associative cache memory. As all entries of an indexed set are outputted simultaneously from the respective N ways, this results in additional data units, which may be required immediately after the retrieval of a primary data unit, being available at the same time as the primary data unit. As related data units are outputted at the same time, there is an increased probability that the cache memory will not have to be accessed again to retrieve data units related to the primary data unit for which the original cache memory access was initiated. Thus, a performance advantage is gained in that at least one cache access, and the accompanying regeneration of a pointer, is avoided.

Figure 4:
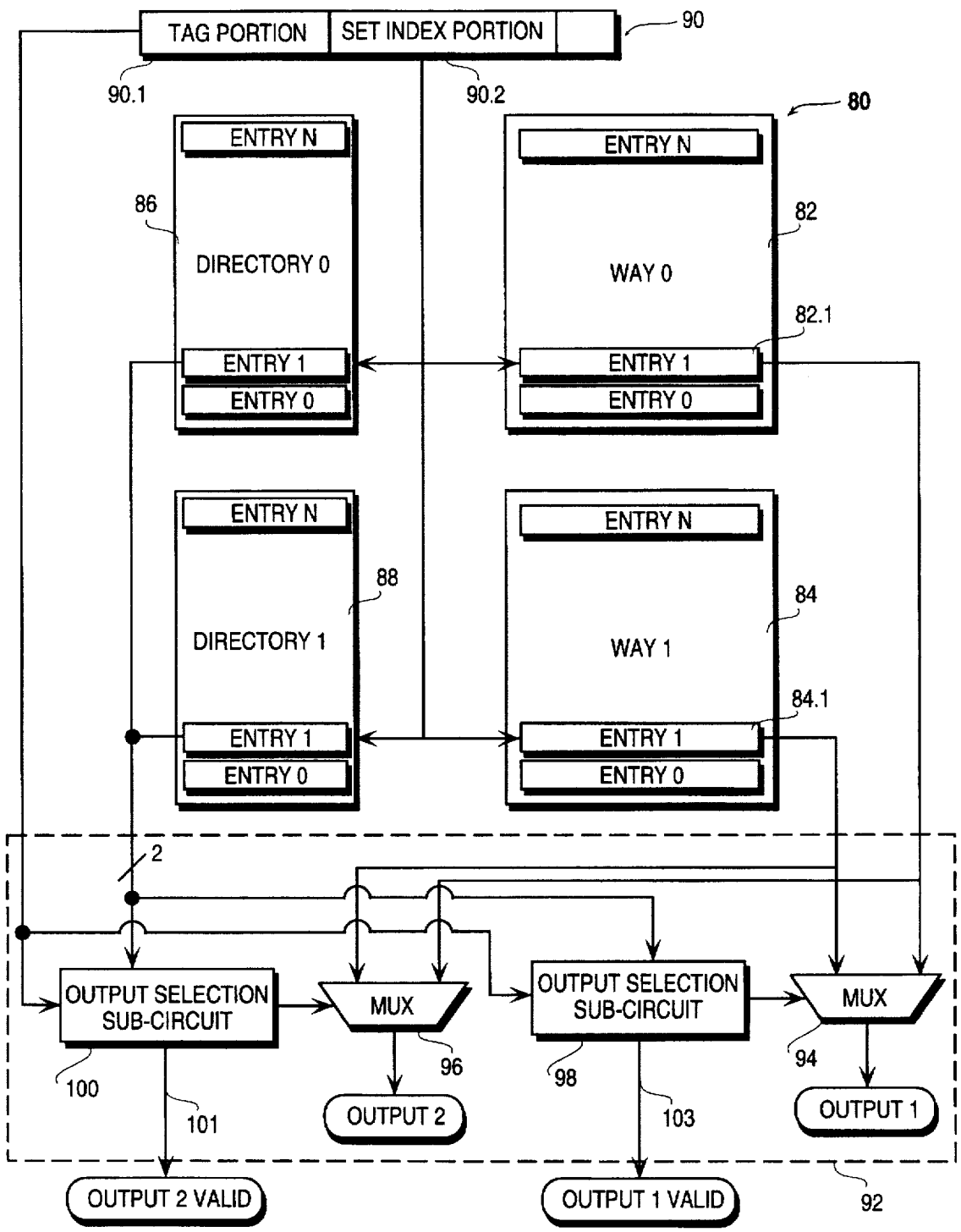
FIG. 4 is a diagrammatic representation of a 2-way, set-associative cache memory arrangement, according to the present invention, from which reads of related data units can be made.

FIG. 4 shows a 2-way, set-associative cache memory arrangement 80 according to the invention and comprising ways 82 and 84 and associated directories 86 and 88. As with the cache memory arrangement of FIG. 1, a pointer value 90, stored in a pointer latch (not shown), has a tag portion 90.1 and a set index portion 90.2. The set index portion 90.2 indexes a set of entries in the ways 82 and 84, this set comprising entries 82.1 and 84.1 of the ways 82 and 84 respectively. The data units stored in the entries 82.1 and 84.1 are related in that, for example, there is a probability that these data units may be required one after the other, or at least within a short time period of each other. The data units stored in the entries 82.1 and 84.1 are transmitted simultaneously, and in parallel, to output selection circuitry 92, which in the illustrated embodiment comprises MUXs 94 and 96, and output selection sub-circuits 98 and 100. The selection sub-circuits 98 and 100 are coupled to receive a number of inputs, specific to the application in which the cache memory arrangement 80 is employed, and each sub-circuit 98 and 100 embodies selection criterion for the output of one of the data units received from the entries 82.1 and 84.1 of the ways 82 and 84. The sub-circuits 98 and 100 also receive the tag values stored in the indexed entries of the directories 86 and 88 for comparison to the tag portion 90.1. Each of the sub-circuits 98 and 100 provides an output selection signal to an associated MUX 94 or 96, the output signal operating the relevant MUX to output one of its two inputs. Each of the sub-circuits 98 and 100 also outputs an OUTPUT VALID signal 101 or 103, which is utilized by downstream circuitry to detect when the output of an associated MUX is valid. It will thus be appreciated, for example, if the data unit (the "primary data unit") stored in entry 82.1 was the target of the read from the cache memory arrangement 80, that data unit (the "secondary data unit") stored in entry 84.1 is also concurrently available for output from cache memory arrangement 80. If it does in fact transpire that the secondary data unit is required, a performance advantage is gained in that a read from the cache memory arrangement 80, and the accompanying regeneration of the pointer value 90, are avoided.

Figure 5:
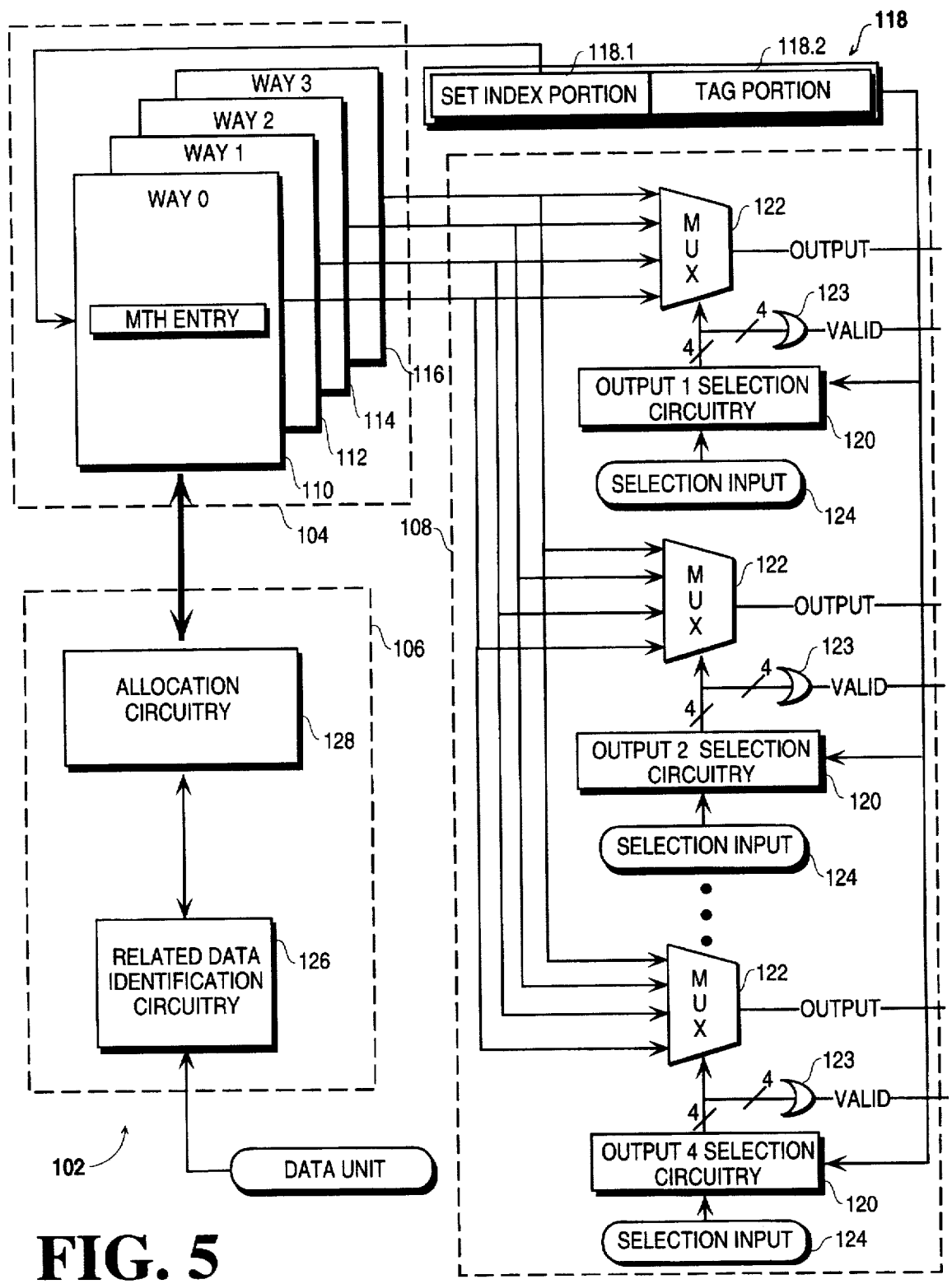
FIG. 5 is a diagrammatic representation of 4-way, set-associative cache memory arrangement, according to the present invention, from which reads of related data units can be made.

Turning to FIG. 5, there is shown further embodiment of the invention, in the form of a 4-way, set-associative cache memory arrangement 102. The cache memory arrangement 102 comprises three broad circuitries, namely memory circuitry 104, memory entry allocation circuitry 106, and output control circuitry 108. The memory circuitry 104 includes four ways 110, 112, 114 and 116, each of which includes N entries. For example, each way may include 128 entries, thus providing the memory circuitry 104 with a total of 512 entries. Corresponding entries in each of the ways are further viewed as "sets" of entries, and each entry of a set is indexed simultaneously by a set index portion 118.2 of a pointer value 118. As illustrated in FIG. 5, the Mth entry of each of the ways 110–116 is indexed by the set index portion 118.2 (which has a width of 7-bits if each way has 128 entries) of a specific pointer value 118, the Mth entries of the ways 110–166 comprising a set of entries. When so indexed, the data units stored in the set of entries are outputted from the memory circuit 104, in parallel and simultaneously, to the output control circuitry 108. In the embodiment illustrated in FIG. 5, the output control circuitry 108 comprises discrete output selection circuitries 120 for operating MUXs 122 to select one of the data units, received from the indexed set of entries in the ways 110–116, as an output. Each of the output selection circuitries 120 embodies a predetermined selection criteria, and is coupled to receive a number of selection inputs 124 which are analyzed accordingly to the selection criteria embodied in each of the output selection circuitries 120. The selection inputs 124, and the selection criteria embodied in the output selection circuitries 120, are specific to the application of the cache memory arrangement 102. For example, if the cache memory arrangement 102 is employed as an instruction cache, the output selection circuitries 120 may be configured to output instructions stored at successive locations in main memory (i.e. at memory locations X, X+1, X+2 and X+3), these instructions having been allocated to a common set by the memory entry allocation circuitry 106. If the cache memory arrangement 102 is employed as a translation lookaside buffer (TLB), or to maintain a branch prediction table (BPT), the output selection circuitries 120 would accordingly be configured to embody selection criteria, and coupled to receive selection inputs 124, determined by these employments.

The 4-bit output of each of the output selection circuitries 120 is further fed to an OR gate 123, associated with the MUX 122 to which this output is also fed. Each OR gate 123 a VALID signal, indicating the output of the associated MUX 122 to be valid, if the relevant output selection circuitry indicates one of the inputs to the MUX to be a valid output (for example, the VALID signal may be asserted if any one of the 4 output bits of the output selection circuitry is high). The VALID signals outputted from the OR gates 123 may be monitored by downstream circuitry to determine whether the output of a particular MUX 122 is valid.

In one embodiment, the memory entry allocation circuitry 106 comprises two circuitries, namely related data identification circuitry 126 and allocation circuitry 128. The circuitries 126 and 128 may be implemented as a single functional unit, or may be implemented as sub-circuits within different function units. The circuitry 126 is coupled to receive data units for allocation to entries within the memory circuit 104. The circuitry 126 then examines these data units, as well as data units already allocated entries within the memory circuitry 104, to detect predetermined relationships between received two data units, or between a received data unit and an already stored data unit. The relationship between related data units arises from a probability that the related data units may be read successively from the memory circuit 104. Merely for example, the data units may be instructions, and the circuitry 126 may be configured to identify instructions stored at successive entries in main memory as related. Alternatively, the circuitry 126 may be configured to identify a branch instruction, and an instruction stored at a branch target address of the branch instruction, as being related. Having identified related data units, the circuitry 126 forwards this relationship information, together with the received data unit, to the allocation circuitry 128. The allocation circuitry 128 will then allocate the received data unit to an appropriate set of entries (for example a set comprising the Mth entries of each of the ways 110–116) storing data units to which the received data unit is related.

Figure 6:
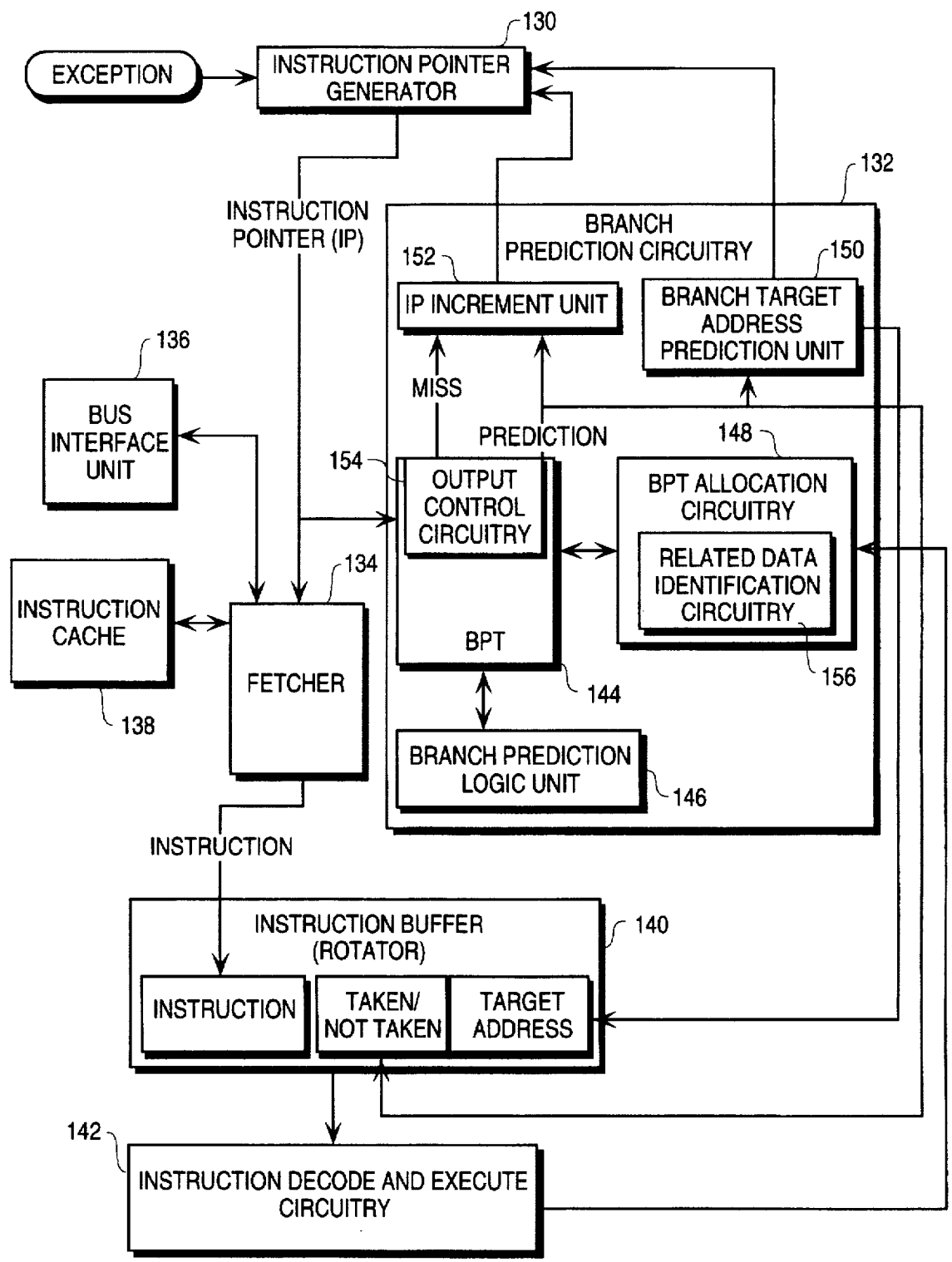
FIG. 6 is a diagrammatic representation of microprocessor circuitry including branch prediction circuitry in which the present invention is implemented.
Figure 7:
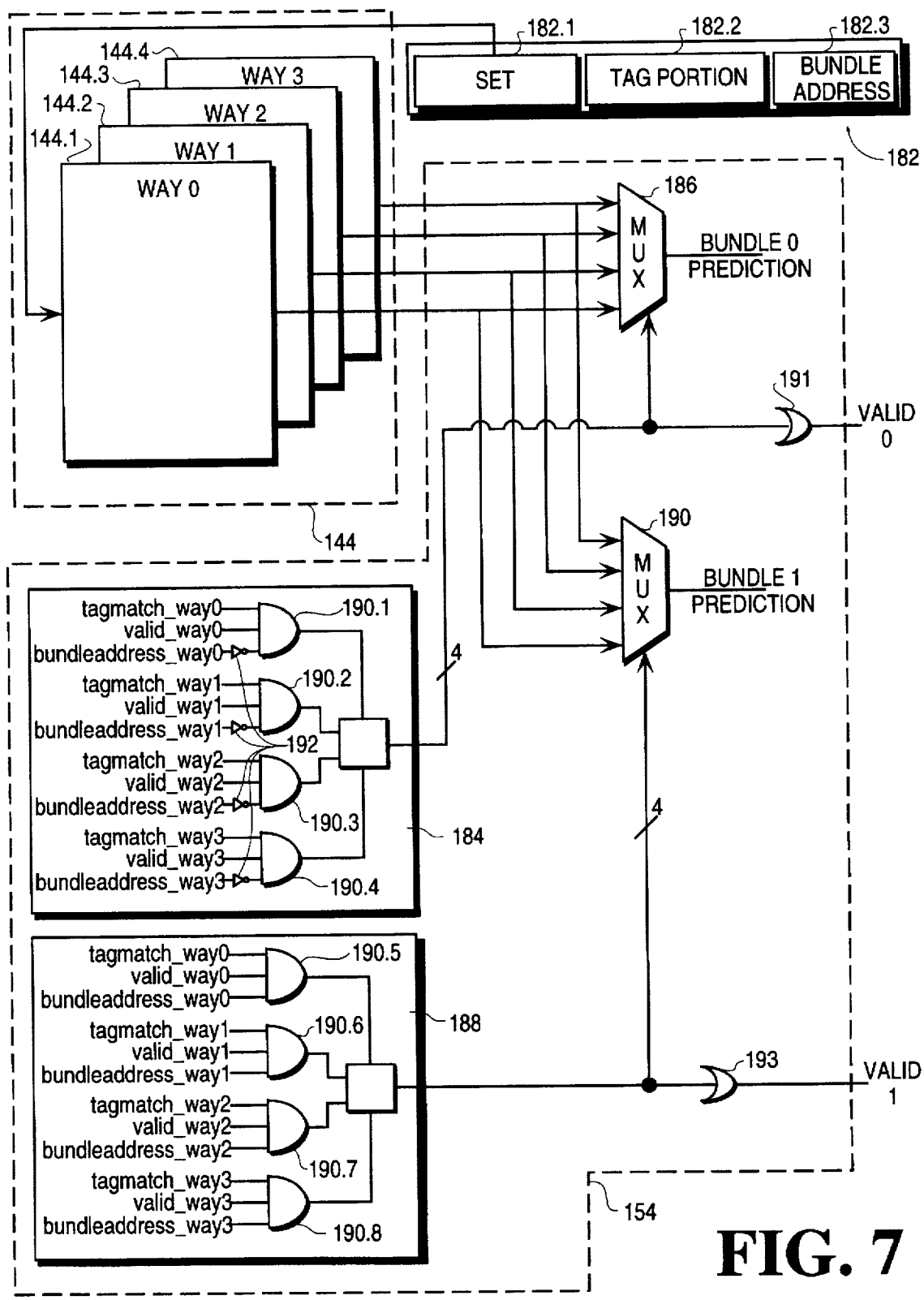
FIG. 7 is a diagrammatic representation of a branch prediction table (BPT), and associated circuitry, which form part of the branch prediction circuitry shown in FIG. 6.

FIGS. 6, 7 and 8 detail an exemplary embodiment of the present invention, wherein the invention is employed to maintain a branch prediction table (BPT) within a branch prediction unit. Referring to FIG. 6, there is shown a diagrammatic representation of a portion of a microprocessor including an instruction pointer generator 130, branch prediction circuitry 132, a fetcher 134, a bus interface unit 136, an instruction cache 138, an instruction buffer 140, and an instruction decode and execute circuitry 142. The branch prediction circuitry 132 provides predictions of either "taken" or "not taken" for branch instructions encountered in an instruction stream, and is responsible for generating and issuing branch target addresses to the instruction pointer generator 130 when branch instructions are predicted as "taken". Instructions retrieved and processed through the various pipe stages of the microprocessor following a speculatively predicted branch instruction are regarded as being "speculative" until the conditions set by the predicted branch instruction are resolved. Once the predicted branch instruction is resolved, the speculatively processed instructions are either retired (or committed) if the prediction was correct, or flushed from the microprocessor if the prediction was incorrect.

Figure 8A:
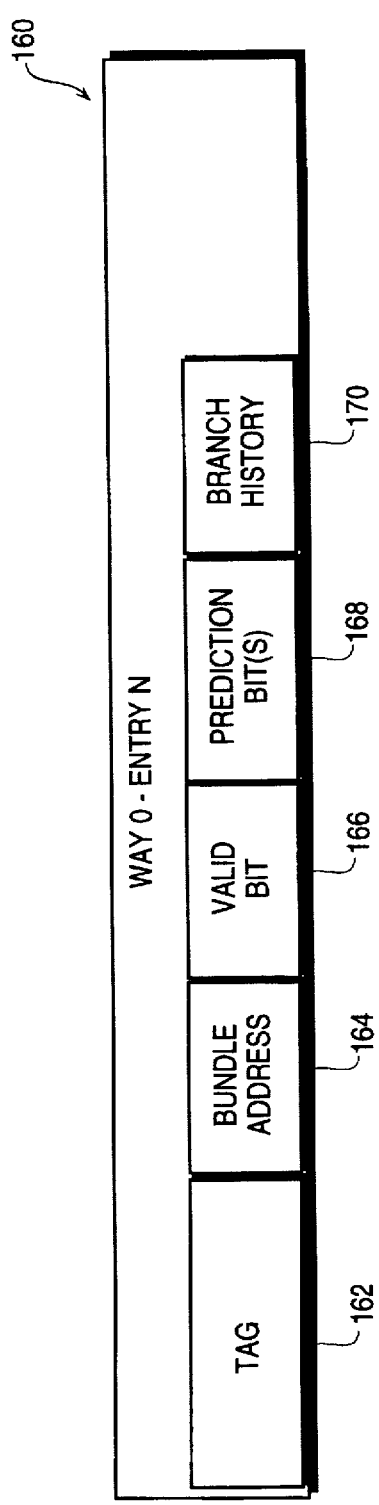
FIG. 8A is diagrammatic representation of a BPT cache set within the BPT shown in FIG. 7.
Figure 8B:
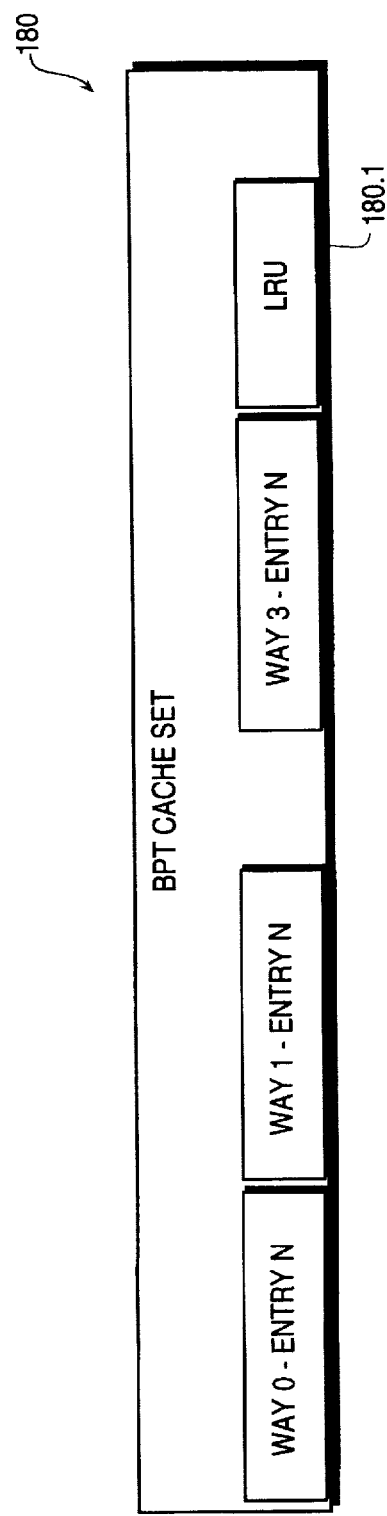
FIG. 8B is a diagrammatic representation of the contents of a entry within a way of the BPT shown in FIG. 7.

The branch prediction circuitry 132 comprises a BPT 144, which includes output control circuitry 154, a branch prediction logic unit 146, BPT allocation circuitry 148, a branch target address prediction unit 150 and an instruction pointer (IP) increment unit 152. The BPT 144 is a cache memory, and maintains prediction records for branch instructions recently encountered during the execution of a computer program. While the BPT 144 will be largely empty during the early stages of execution of the computer program, as more and more branch instructions are processed through the instruction decode and execute circuitry 142, information concerning the resolution of these branch instructions is fed back to the branch prediction circuitry 132, and specifically to the BPT allocation circuitry 148, which then allocates entries in the BPT 144 to the branch instruction information. The BPT allocation circuitry 148 also inputs, inter alia, an associated tag with the branch instruction information into each entry of the BPT 144, by which the entry can be identified to register a "hit" within the BPT 144. Referring to FIG. 8A, there is shown an example of an entry 160 within the BPT 144. The entry 160 includes a tag field 162, a bundle address field 164, a valid bit field 166, a prediction bit field 168 and a branch history field 170. The tag field 162 is used to identify a "hit" within the BPT 144 when the contents of this field correspond to a tag portion of an instruction pointer. The bundle address field 164 is used to identify one of two "bundles" of instructions that may be stored in a common instruction cache line within the instruction cache 138. The valid bit field 166 indicates whether the entry 160 is valid, and this bit will be set to 0 when the entry 160 is deallocated. The prediction bit field 168 indicates whether the branch instruction associated with the entry 160 will be "taken" or "not taken". The state of the field 168 is set by the branch prediction logic unit 146, which employs a prediction algorithm and branch resolution information, such as that stored in the branch history field 170, to determine the state of the field 168. The branch history field 170 maintains a record of the branch history for the branch instruction associated with the BPT entry 160, and the contents of this field 170 may be utilized by the branch prediction logic unit 146 to determine the contents of the prediction bit field 168. FIG. 7 shows a more detailed diagrammatic representation of BPT 144 and the output control circuitry 154. The BPT 144 is shown to comprise a 4-way, set-associative cache memory. Specifically, the BPT 144 comprises four ways 144.1–144.4, each of these ways having 128 entries. An example of the contents and structure of each of these 128 entries is discussed above with reference to FIG. 8. Corresponding entries in each of the ways 144.1–144.4 are arranged into "sets". An example of a BPT cache set is provided at 180 in FIG. 8B, which shows the set 180 as including corresponding entries from each of the ways, and a least recently used (LRU) field 180.1, which is utilized by a deallocation algorithm when deciding which entries in the BPT 144 should be deallocated to make room for new data.

The entries of the ways 144.1–144.4 are indexed by a set index portion 182.1 of an instruction pointer value 182 issued from the instruction pointer generator 130. The set index portion 182.1 will cause prediction values (either 0 or 1), stored in the prediction fields 168 of the indexed entries comprising a set, to be outputted in parallel to the output control circuitry 154. As will readily be appreciated, the number of indexed entries is equal to the number of ways within the set-associative memory.

Referring back to FIG. 6, the BPT allocation circuitry 148 is configured to allocate entries in a common set, within the BPT 144, to branch information (such as branch resolution or prediction information) pertaining to related branch instructions. Specifically, related data identification circuitry 156 is included within the BPT allocation circuitry 148. The identification circuitry 165 may identify branch information, received from the instruction decode and execute circuitry 142, as being related to branch information already stored within the BPT 144. Specifically, the identification circuitry 165 may identify the received branch information as pertaining to a branch instruction included in a first instruction "bundle", and the stored branch information as pertaining to a second branch instruction included in a second instruction "bundle", where the first and second instruction bundles are indexed by the same instruction pointer. Two "bundles" may be indexed by a common instruction pointer value when they are stored in a common instruction cache line within the instruction cache 138, and are simultaneously retrievable from the instruction cache line by the fetcher 134. The identification process performed by the identification circuitry 148 comprises comparing a "tag portion" of an address for the received branch information with tags for entries within the BPT 144. If there is a match, a "bundle" bit is examined to determine whether the received branch information relates to a different branch than that to which the branch information already stored in the BPT 144 relates. If so, the received branch information is allocated an entry in the same set as the stored branch information. Thus, in the exemplary embodiment, branch information is related to other branch information by the location of branch instructions, to which the information relates, being indexed by a common instruction pointer value, and stored in a common cache line.

Referring to FIG. 7, the output control circuitry 154 comprises output selection circuitries 184 and 188, which embody the criteria for the selection of prediction outputs from MUXs 186 and 190 respectively. The circuitry 184 causes a prediction (taken/not taken) for a branch instruction included in a "bundle 0" to be outputted from MUX 186, while circuitry 188 causes a prediction for a branch instruction included in a "bundle 1" to be outputted from MUX 190 when required. Specially, the prediction for a branch instruction included in "bundle 0" (being the sequentially preceding bundle in the instruction stream) may be outputted as a matter of course, whereas the prediction for a branch instruction included in "bundle 1" will only be required if the prediction outputted from MUX 186 is "not taken". If the prediction outputted from MUX 186 is "taken", then the instruction stream is resteered to a branch target address, and the prediction for a branch instruction included in the sequentially proceeding bundle, such as "bundle 1", will not be required.

The output selection circuitries 184 and 188 each include four AND gates 190.1–190.8, each of which is coupled to receive three inputs. The three inputs are:

1. tagmatch_way X: this signal is asserted if the tag portion 182.2 of the instruction pointer value 182 corresponds to the contents of the tag field 162 of an entry of way X indexed by the set portion 182.1. The determination of whether this signal is asserted is made by a comparator (not shown).

2. valid_way X: this signal is derived from the contents of the valid bit field 166 of an entry of way X indexed by the set portion of 182.1, and indicates whether the entry is valid or not.

3. bundleaddress_way X: this signal mirrors the contents of the bundle address field 164 of an entry of way X indexed by the set portion of 182.1, and identifies the bundle (for example "bundle 0" or "bundle 1") in which the relevant branch instruction is included.

The "bundleaddress" signals coupled to the AND gates 190.1–190.4 of the circuitry 184 are inverted by inverters 192, so that the outputs of these AND gates 190.1–190.4 will only be asserted for a "hit" on a valid entry for a branch instruction included in "bundle 0". It will be appreciated that the outputs of the AND gates 190.1–190.4 indicate to MUX 186 which of the entries, if any, of the selected set from the ways 144.1–144.4 contains a prediction for a branch instruction included in "bundle 0". Similarly, the AND gates 190.5–190.8 indicate to MUX 188 which of entries, if any, of the selected set from the ways 144.1–144.4, contains a prediction for a branch instruction included in "bundle 1". The outputs of the AND gates 190.–190.4 and AND gates 190.5–190.8 are also propagated to OR gates 191 and 193 respectively, to generate VALID signals for the MUXs 186 and 190. If the output of any of the AND gates 190.1–190.8 is high (indicating "hit" for one of the ways), the OR gate coupled to receive the output of the relevant AND gate will output a VALID signal indicating the output of an associated MUX to be valid.

It will be appreciated that the predictions for the branch instructions included in "bundle 0" and "bundle 1" will be concurrently available from the output control circuitry 154. While it is conceivable that the prediction available from MUX 190 (i.e. the prediction for a branch instruction in "bundle 1") may not be required if the prediction outputted from MUX 186 (i.e. the prediction for a branch instruction in "bundle 0") is that of "taken", it is also possible that the prediction available from MUX 190 will be required if the output from MUX 186 is that of "not taken". In this second scenario, the exemplary embodiment described above provides a performance advantage, in that the instruction pointer value 182 does not have to be regenerated, and the BPT 144 does not have to be reaccessed, to retrieve a valid prediction for the branch instruction included in "bundle 1". As the prediction for this branch instruction is already available, the output from MUX 190 merely has to be read.

Accordingly, by allocating entries of a common set to branch information units that are related, and outputted from a set-associative memory concurrently, a conceptual "sub-cache" of immediately available data, already read from entries within the cache, is provided. If information from this conceptual "sub-cache" is required, a performance advantage is achieved in that a read from the cache memory is avoided.

Figure 9:
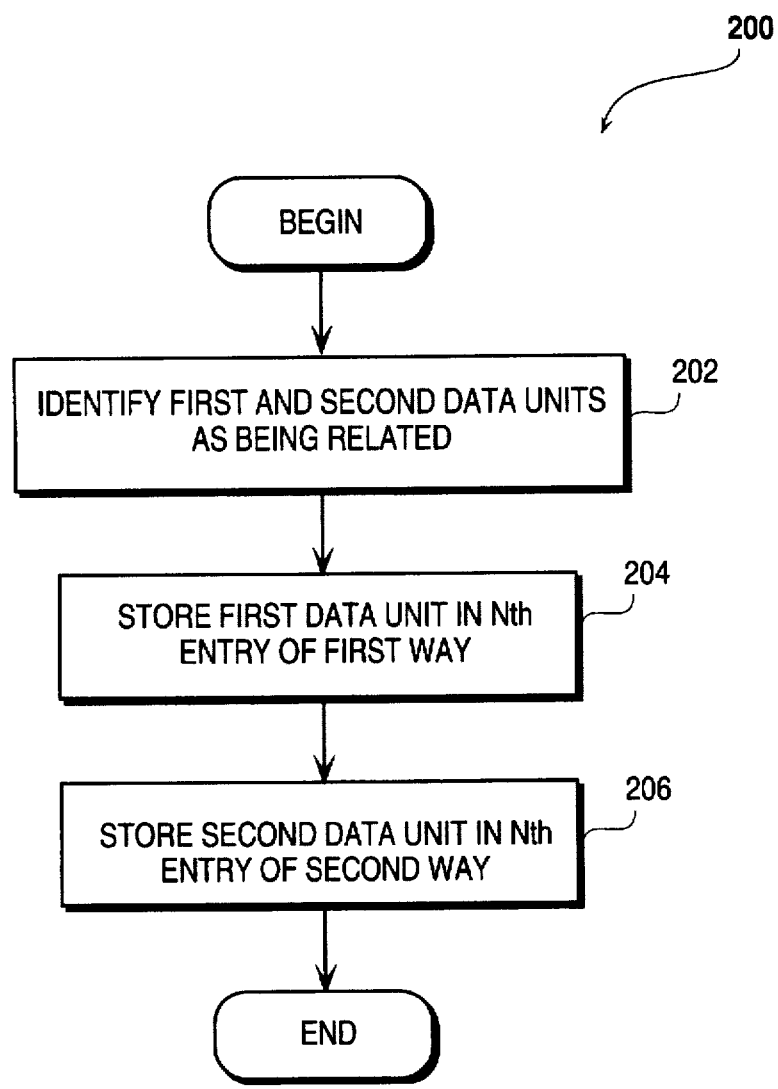
FIG. 9 is a flowchart illustrating a method, according to the present invention, of allocating entries of a common set in a N-way, set associative cache memory to related data units.

FIG. 9 is a flowchart illustrating a generic method 200, according to the invention, of allocating entries of a common set in a N-way, set-associative memory, to related data units. At step 202, first and second data units are identified as being related. The data units may be identified as being related by the probability that the respective data units may be required to be outputted from a cache memory arrangement sequentially, or at least in close temporal proximity. At step 204, the first data unit is stored in the Nth entry of a first way, and at step 206, the second data unit is stored in the Nth entry of a second way. The Nth entries of the first and second ways comprise a set, and the contents of these entries can accordingly be outputted concurrently from the first and second ways.

Figure 10:
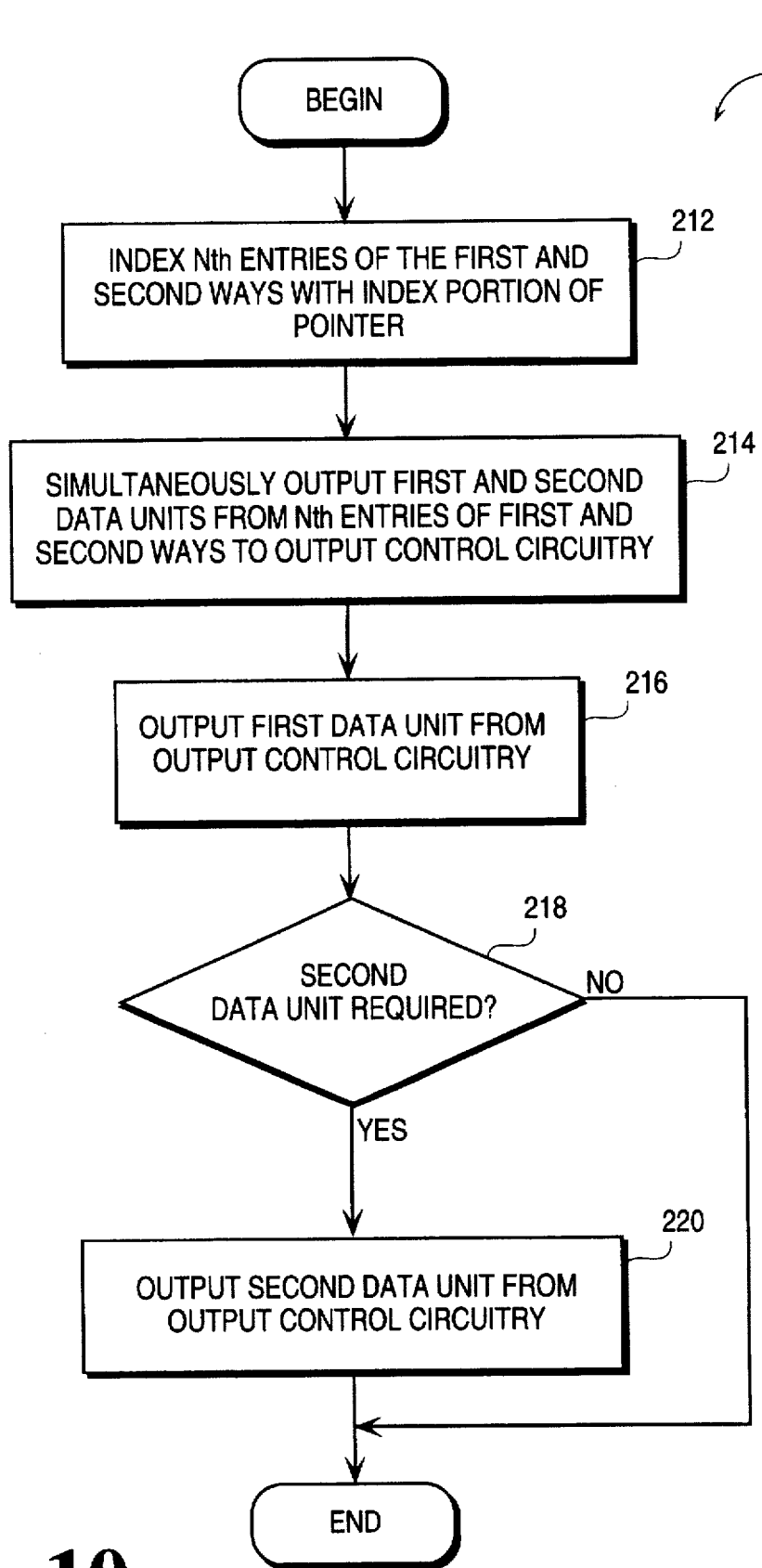
FIG. 10 is a flowchart illustrating a method, according to the present invention, of simultaneously retrieving related data units, allocated to entries according to the method illustrated in FIG. 9, from N-way, set associative cache memory.

FIG. 10 is a flowchart illustrating a generic method 210, according to the invention, of retrieving the first and second data units, allocated to entries of a common set in a N-way, set-associative memory according to the method 200. At step 212, the Nth entries of the first and second ways are indexed by a set index portion of a pointer value. At step 214, the first and second data units are concurrently propagated from the Nth entries of the first and second ways to output control circuitry. At step 216, the first data unit is outputted from the output control circuitry, and at step 218 a determination is made as to whether the second data unit is to be outputted. If not, the method terminates. If the second data unit is required, then this data unit is outputted from the output control circuitry at step 220, without the regeneration of the pointer value, and without having to reaccess the N-way, set associative cache memory.

Figure 11:
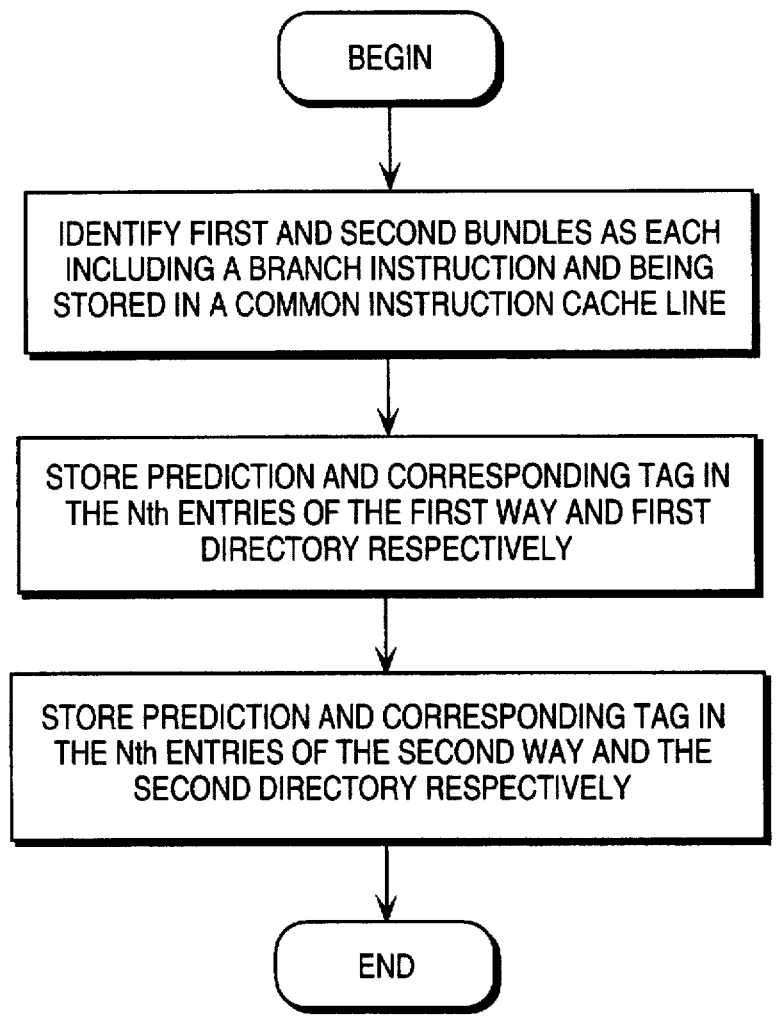
FIGS. 11 and 12 are flowcharts illustrating application-specific examples of the methods, according to the invention, shown in FIGS. 9 and 10 respectively.
Figure 12:
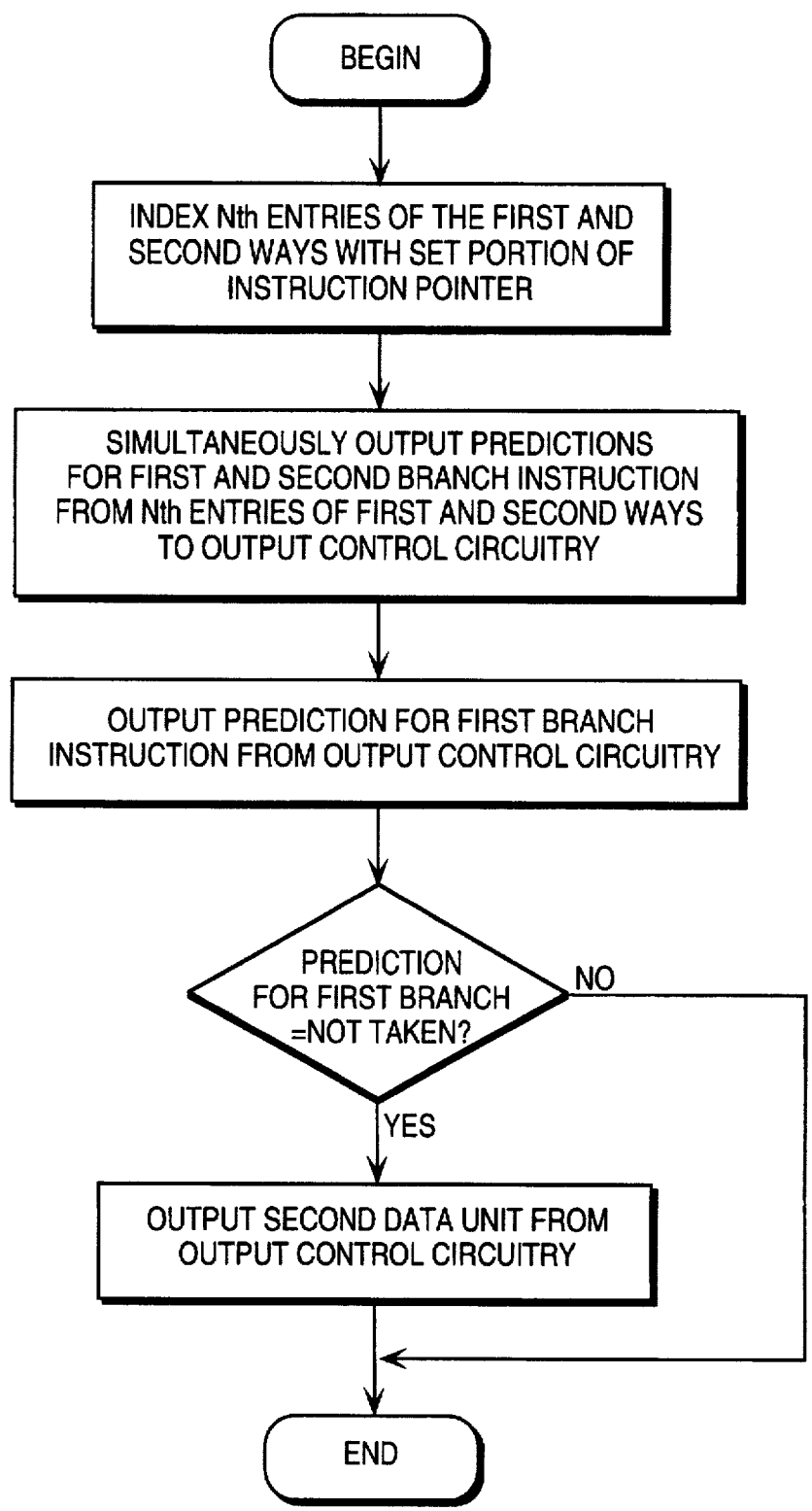

FIGS. 11 and 12 detail methods 220 and 230 of respectively allocating entries within the BPT 144, as described above, to related branch information (such as branch prediction and resolution information), and of retrieving this branch information from the entries in the BPT 144. Specially, the branch information is related by the location of branch instructions, with which the branch information is associated, in a common instruction cache line.

Thus, a method and apparatus for allocating and retrieving related data from a set-associative cache memory have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method of allocating entries within a set-associative cache memory having first and second ways, each way having a plurality of entries, wherein corresponding entries of each of the first and second ways comprise respective sets of entries, the method comprising the steps of:

identifying first and second data units as being related by a probability of being successively read from the cache memory; and storing the first and second data units in the corresponding entries in the respective first and second ways, so that the first and second data units are stored in a common set.

2. The method of claim 1 wherein the step of identifying the first and second data units as being related comprises identifying the first data unit as being associated with a main memory address X, and identifying the second data unit as being associated with a main memory address X+1.

3. The method of claim 1 wherein the set-associative cache memory maintains a branch prediction table, and the step of identifying the first and second data units as being related comprises identifying the first data unit as being prediction data for a branch instruction located at main memory address X, and identifying the second data unit as being prediction data for a branch instruction located at main memory address X+1.

4. The method of claim 1 wherein the step of identifying the first and second data units as being related comprises identifying the first data unit as being associated with a main memory address at which is stored a branch instruction, and identifying the second data unit as being associated with a main memory address at which is a target address of the branch instruction.

5. The method of claim 1 wherein the set-associative cache memory maintains a branch prediction table, and the step of identifying the first and second data units as being related comprises identifying the first data unit as being a prediction for a first branch instruction, and identifying the second data unit as being a prediction for a second branch instruction which is located at a target address of the first branch instruction.

6. The method of claim 1 wherein the step of identifying the first and second data units as being related comprises identifying the first data unit as being related to a first instruction and identifying the second data unit as being related to a second instruction, wherein the first and second instructions are stored within a common instruction cache line in an instruction cache.

7. A computer-implement method of accessing a set-associative cache memory including first and second ways, wherein each of the first and second ways has first and second entries and wherein the respective first entries together comprise a first set and the respective second entries together comprise a second set, the method comprising the steps of:

identifying first and second information units as being related by a probability of being successively read from the cache memory;

storing the first information unit in the first entry of the first way, and the second information unit in the first entry of the second way, so that the first and second information units are stored in the first set;

indexing both the first entries in each of the first and second ways with a pointer; and simultaneously outputting the first and second information units from the first entries of the first and second ways to output selection circuitry.

8. The method of claim 7 wherein the set-associative cache memory maintains a branch prediction table, and the first information unit is prediction information relating to a first branch instruction and the second information unit is prediction information relating to a second branch instruction, the method including the steps of:

determining whether the prediction information for the first branch instruction indicates the first branch instruction as being not taken;

if so, then outputting the prediction information for the first and second branch instructions from the output selection circuitry; and if not, then outputting only the prediction information for the first branch instruction from the output selection circuitry.

9. A computer-implement method of allocating information units to, and retrieving information units from, a set-associative memory cache including X ways, wherein each of the X ways has Y entries and wherein corresponding entries in each of the X ways comprise a set, the method comprising the steps of:

identifying M information units, to be stored in the set-associative cache memory, as being related by a probability of being successively read from the cache memory;

storing each of the M information units in a Nth entry in a respective way, so that the M information units are stored in a common set;

indexing the Nth entries of each of the X ways with a pointer; and concurrently outputting the M information units from the Nth entries of the X ways.

10. Allocation circuitry for allocating entries within a set-associative cache memory, the set-associative cache memory comprising first and second ways, each way having first and second entries, the first entries of the respective first and second ways comprising a first set, and the second entries of the respective first and second ways comprising a second set, the allocation circuitry comprising:

a first circuit configured to identify first and second data units as being related by a probability of being successively read from the cache memory; and a second circuit configured to allocate the first entries of each of the first and second ways to the first and second data units respectively, so that the first and second data units are stored in a common set of entries.

11. The allocation circuitry of claim 10 wherein the first circuit is configured to identify the first and second data units as being related by identifying the first data unit as being associated with a main memory address X, and identifying the second data unit as being associated with a main memory address X+1.

12. The allocation circuitry of claim 10 wherein the set-associative cache memory maintains a branch prediction table, and the first circuit identifies the first and second data units as being related by identifying the first data unit as being prediction data for a branch instruction located at main memory address X, and by identifying the second data unit as being prediction data for a branch instruction located at main memory address X+1.

13. The allocation circuit of claim 10 wherein the first circuit is configured to identify the first and second data units as being related by identifying the first data unit as being associated with a main memory address at which is stored a branch instruction, and identifying the second data unit as being associated with a main memory address which is a target address of the branch instruction.

14. The allocation circuit of claim 10 wherein the first circuit is configured to identify the first and second data units as being related by identifying the first data unit as being related to a first instruction and identifying the second data unit as being related to a second instruction, wherein the first and second instructions are stored within a common instruction cache line in an instruction cache.

15. A set-associative cache memory arrangement comprising:

a set-associative cache memory having first and second ways, wherein each of the first and second ways has first and second entries and wherein the respective first entries together comprise a first set and the respective second entries together comprise a second set;

allocation circuitry configured to identifying first and second data units, to be stored in the set-associative cache memory, as being related by a probability of being successively read from the cache memory, and to allocate the first data unit to the first entry of the first way, and the second data unit to the first entry of the second way, so that the first and second data units are stored in the first set; and retrieval circuitry configured to index the first entries in each of the first and second ways with a pointer, and simultaneously to retrieve the first and second data units from the first entries of the first and second ways.

16. The set-associative cache memory of claim 15 wherein the retrieval circuitry is configured successively to output the first and second data units.

17. The set-associative cache memory of claim 15 wherein the retrieval circuitry is configured to output first and second valid signals, associated with the first and second data units, to indicate the first and second data units as being valid or invalid.

18. Apparatus for allocating entries within a set-associative cache memory, the set-associative cache memory comprising first and second ways, each way having first and second entries, the first entries of the respective first and second ways comprising a first set, and the second entries of the respective first and second ways comprising a second set, the apparatus comprising:

identification means for identifying first and second data units as being related by a probability of being successively read from the cache memory; and allocation means for allocating the first entries of each of the first and second ways to the first and second data units respectively, so that the first and second data units are stored in a common set of entries.

19. The apparatus of claim 18 wherein the identification means is configured to identify the first and second data units as being related by identifying the first data unit as being associated with a main memory address X, and identifying the second data unit as being associated with a main memory address X+1.

20. The apparatus of claim 18 wherein the set-associative cache memory maintains a branch prediction table, and the identification means identifies the first and second data units as being related by identifying the first data unit as being prediction data for a branch instruction located at main memory address X, and by identifying the second data unit as being prediction data for a branch instruction located at main memory address X+1.

21. The apparatus of claim 18 wherein the identification means is configured to identify the first and second data units as being related by identifying the first data unit as being associated with a main memory address at which is stored a branch instruction, and identifying the second data unit as being associated with a main memory address which is a target address of the branch instruction.

22. The apparatus of claim 18 wherein the identification means is configured to identify the first and second data units as being related by identifying the first data unit as being related to a first instruction and identifying the second data unit as being related to a second instruction, wherein the first and second instructions are stored within a common instruction cache line in an instruction cache.

* * * * *